United States Patent
Qi et al.

(10) Patent No.: US 10,796,077 B2
(45) Date of Patent: Oct. 6, 2020

(54) RULE MATCHING METHOD AND DEVICE

(71) Applicant: Beijing Gridsum Technology Co., Ltd., Beijing (CN)

(72) Inventors: Guosheng Qi, Beijing (CN); Xin He, Beijing (CN)

(73) Assignee: Beijing Gridsum Technology Co., Ltd., Beijing (CN)

(*) Notice: Subject to any disclaimer, the term of this patent is extended or adjusted under 35 U.S.C. 154(b) by 51 days.

(21) Appl. No.: 16/065,810

(22) PCT Filed: Nov. 25, 2016

(86) PCT No.: PCT/CN2016/107314
§ 371 (c)(1),
(2) Date: Jun. 24, 2018

(87) PCT Pub. No.: WO2017/107738
PCT Pub. Date: Jun. 29, 2017

(65) Prior Publication Data
US 2019/0012300 A1    Jan. 10, 2019

(30) Foreign Application Priority Data
Dec. 24, 2015 (CN) .......................... 2015 1 0993093

(51) Int. Cl.
*G06F 40/151*    (2020.01)
*G06F 40/20*    (2020.01)
(Continued)

(52) U.S. Cl.
CPC .......... *G06F 40/151* (2020.01); *G06F 40/117* (2020.01); *G06F 40/194* (2020.01); *G06F 40/20* (2020.01)

(58) Field of Classification Search
CPC ... G06F 17/2264; G06F 17/218; G06F 17/221
(Continued)

(56) References Cited

U.S. PATENT DOCUMENTS 9,684,496 B1 * 6/2017 Reid ..................... G06F 8/427
2009/0265339 A1 * 10/2009 Chen ............... G06F 17/2247
(Continued)

FOREIGN PATENT DOCUMENTS

CN    1392497 A    1/2003
CN    101727466 A    6/2010
(Continued)

OTHER PUBLICATIONS

International Search Report issued in International Patent Application No. PCT/CN2016/107314 dated Mar. 2, 2017 (4 pages).

*Primary Examiner* — Jakieda R Jackson
(74) *Attorney, Agent, or Firm* — Armstrong Teasdale LLP

(57) ABSTRACT

Provided are a rule matching method and device. The method includes: a preset tagging symbol set and a target text are acquired, wherein the tagging symbol set includes a plurality of tagging symbols (S101), the plurality of tagging symbols are symbols which are used for tagging a text according to different business requirements; a plurality of matching rule templates are determined according to the plurality of tagging symbols (S102); the target text is converted according to the plurality of tagging symbols to obtain a sequence to be matched (S103); and a matching process is performing, by using the plurality of matching rule templates, on the sequence to be matched (S104). The method solves the problem in the related art in which a rule matching method cannot match implicit text information.

4 Claims, 2 Drawing Sheets

(51) Int. Cl.
*G06F 40/117* (2020.01)
*G06F 40/194* (2020.01)

(58) Field of Classification Search
USPC .............................................. 704/9
See application file for complete search history.

(56) References Cited

U.S. PATENT DOCUMENTS

2011/0035210 A1* 2/2011 Rosenfeld ............. G06F 17/278
704/9
2015/0356072 A1* 12/2015 He ...................... G06F 16/3331
704/9

FOREIGN PATENT DOCUMENTS

| | | |
|---|---|---|
| CN | 102541960 A | 7/2012 |
| CN | 102609459 A | 7/2012 |
| CN | 103136221 A | 6/2013 |
| CN | 103235774 A | 8/2013 |
| CN | 103440252 A | 12/2013 |
| CN | 103440315 A | 12/2013 |
| CN | 103455471 A | 12/2013 |
| CN | 103631882 A | 3/2014 |
| CN | 104361127 A | 2/2015 |
| CN | 104572636 A | 4/2015 |
| WO | 2015087075 A1 | 6/2015 |
| WO | 2015093540 A1 | 6/2015 |

* cited by examiner

RULE MATCHING METHOD AND DEVICE

CROSS-REFERENCE TO RELATED APPLICATIONS

This application is the national stage entry of PCT/CN2016/107314, filed on Nov. 25, 2016, which claims the benefit of priority to Chinese Patent Application No. 201510993093.7, filed Dec. 24, 2015, which are incorporated by reference in their entirety herein.

TECHNICAL FIELD

The present disclosure relates to the field of natural language processing, and more particularly to a rule matching method and device.

BACKGROUND

A regular expression is a logic formula for operating a character string, namely refers to forming a "regular character string" by using some predefined specific characters and combination of these specific characters, the "regular character string" being used to express a filtering logic for a character string. By giving a regular expression and another character string, the following purposes may be achieved: 1, the given character string satisfies the filtering logic (referred to as "matching") of the regular expression; and 2, specific parts desired by a user may be acquired from the character string from the regular expression. Because of this strong characteristic, the regular expression plays an important role in the fields of natural language processing and text processing. However, as demands for text processing in the field are increasing, the regular expression cannot already efficiently meet demands for such problems. For example, the regular expression is to identify a sentence adopting a certain grammar such as "{Moushi Moudi}, {Mouren} Zuole {Moushi}". For another example, it is to extract some entities and relationships therebetween. However, entity words are more possible, or they cannot be enumerated one by one. For example, a conjugal relationship is extracted from "{Mourenjia} is the husband of {Mourenyi}". The similarities of these demands are that a general matching rule cannot be rarely found via a text, {Mourenjia} is more possible, and a personal name in a Chinese text is connected with a context thereof without segmentation, that is, implicit text information cannot be matched.

Any effective solution has not been proposed yet at present for the problem in the related art in which a rule matching method cannot match implicit text information.

SUMMARY

The main objective of the present disclosure is to provide a rule matching method and device, used to solve the problem in the related art in which a rule matching method cannot match implicit text information.

To this end, according to an aspect of the present disclosure, a rule matching method is provided. The method includes: acquiring a preset tagging symbol set and a target text, wherein the tagging symbol set comprises a plurality of tagging symbols, the plurality of tagging symbols are symbols which are used for tagging a text according to different business requirements; determining a plurality of matching rule templates according to the plurality of tagging symbols; converting the target text according to the plurality of tagging symbols to obtain a sequence to be matched; and performing, by using the plurality of matching rule templates, a matching process on the sequence to be matched.

According to an example embodiment, performing, by using the plurality of rule matching templates, the matching process on the sequence to be matched comprises: determining a first matching rule template from the plurality of matching rule templates, wherein the first matching rule template comprises a plurality of match items; matching one by one, each match item in the first matching rule template with a corresponding character in the sequence to be matched; when in the sequence to be matched, there is a corresponding character matched one by one with each match item in the first matching rule template, determining that a matching result is True; and when in the sequence to be matched, there is not a corresponding character matched one by one with each match item in the first matching rule template, taking a second matching rule template in the plurality of matching rule templates as the first matching rule template to be matched with the sequence to be matched until a matching result is True or all matching rule templates are matched with the sequence to be matched respectively.

According to an example embodiment, the method further comprising: when the matching result is determined as True, acquiring a target item in a matching rule template of which the matching result is True, wherein the target item is an identified result item needing to be returned in the matching rule templates; extracting a value of the target item from the sequence to be matched, as to obtain target content; and sending the target content to a target address.

According to an example embodiment, converting the target text according to the plurality of tagging symbols to obtain the sequence to be matched comprises: performing word segmentation on the target text to obtain a character string sequence, wherein the character string sequence comprises: a sequence formed by a plurality of character string units, the character string units are used for identifying the character string sequence; determining, according to the plurality of tagging symbols, a tagging symbol sequence corresponding to each character string unit in the character string sequence to obtain a tagging symbol sequence set; and taking the tagging symbol sequence set as the sequence to be matched.

According to an example embodiment, after obtaining the tagging symbol sequence set, the method further comprising: combining the character string sequence and the tagging symbol sequence set to obtain the sequence to be matched.

To this end, according to another aspect of the present disclosure, a rule matching device is provided. The device includes: a first acquiring element, configured to acquire a preset tagging symbol set and a target text, wherein the tagging symbol set comprises a plurality of tagging symbols, the plurality of tagging symbols are symbols which are used for tagging a text according to different business requirements; a first determining element, configured to determine a plurality of matching rule templates according to the plurality of tagging symbols; a converting element, configured to convert the target text according to the plurality of tagging symbols to obtain a sequence to be matched; and a matching element, configured to perform, by using the plurality of matching rule templates, a matching process on the sequence to be matched.

According to an example embodiment, the matching element comprises: a first determining component, configured to determine a first matching rule template from the plurality of matching rule templates, wherein the first matching rule template comprises a plurality of match items; a first matching component, configured to match one by one, each match item in the first matching rule template with a corresponding character in the sequence to be matched; an acquiring component, configured to, when in the sequence to be matched, there is a corresponding character matched one by one with each match item in the first matching rule template, determine that a matching result is True; and a second matching component, configured to, when in the sequence to be matched, there is not a corresponding character matched one by one with each match item in the first matching rule template, take a second matching rule template in the plurality of matching rule templates as the first matching rule template to be matched with the sequence to be matched until a matching result is True or all matching rule templates are matched with the sequence to be matched respectively.

According to an example embodiment, the device further comprising: a second determining element, configured to, when the matching result is determined as True, acquire a target item in a matching rule template of which the matching result is True, wherein the target item is an identified result item needing to be returned in the matching rule templates; a second acquiring element, configured to extract a value of the target item from the sequence to be matched, as to obtain target content; and a sending element, configured to send the target content to a target address.

According to an example embodiment, the converting element comprises: a processing component, configured to perform word segmentation on the target text to obtain a character string sequence, wherein the character string sequence comprises: a sequence formed by a plurality of character string units, the character string units are used for identifying the character string sequence; a second determining component, configured to determine, according to the plurality of tagging symbols, a tagging symbol sequence corresponding to each character string unit in the character string sequence to obtain a tagging symbol sequence set; and a third determining component, configured to take the tagging symbol sequence set as the sequence to be matched.

According to an example embodiment, the device further comprising: a processing element, configured to combine, after obtaining the tagging symbol sequence set, the character string sequence and the tagging symbol sequence set to obtain the sequence to be matched.

By means of the present disclosure, the following steps are adopted as follows: a preset tagging symbol set and a target text are acquired, the tagging symbol set including multiple tagging symbols; a plurality of matching rule templates are determined according to the plurality of tagging symbols; the target text is converted according to the plurality of tagging symbols to obtain a sequence to be matched; and a matching process is performed, by using the plurality of matching rule templates, on the sequence to be matched. The problem in the related art in which a rule matching method cannot match implicit text information is solved. By means of rule setup and matching for a tagging symbol hidden behind a sequence to be matched obtained by converting a target text, the effect of matching implicit text information is achieved.

BRIEF DESCRIPTION OF THE DRAWINGS

The drawings, forming a part of the present disclosure, are used to provide further understanding for the present disclosure. The schematic embodiments and illustrations of the present disclosure are used to explain the present disclosure, and do not form improper limits to the present disclosure. In the drawings.

DETAILED DESCRIPTION OF THE EMBODIMENTS

Figure 1:
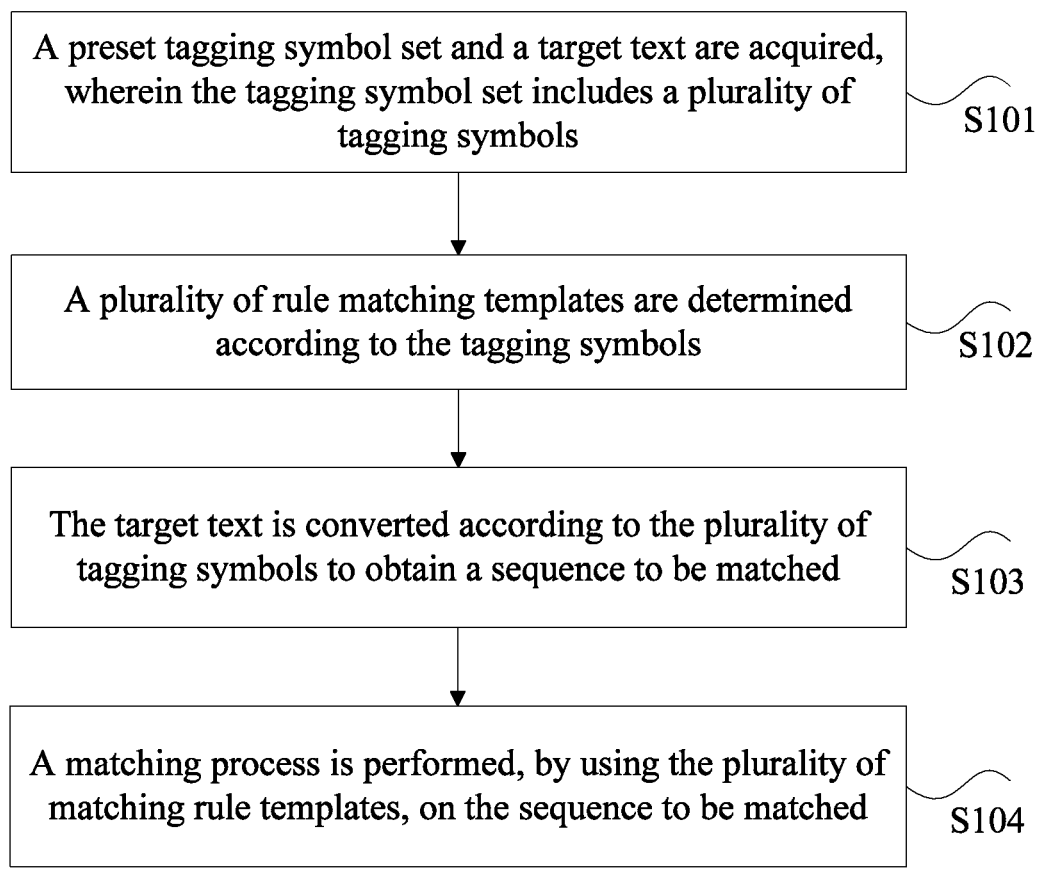
FIG. 1 is a flowchart of a rule matching method according to an embodiment of the present disclosure.

It is important to note that embodiments in the present disclosure and characteristics in the embodiments may be combined mutually under the condition of no conflicts. The present disclosure will be illustrated below with reference to the drawings and in conjunction with the embodiments in detail.

In order to make those skilled in the art better understand the solutions of the present disclosure, the technical solutions in the embodiments of the present disclosure will be clearly and completely described below in conjunction with the drawings in the embodiments of the present disclosure. Obviously, the described embodiments are only a part of the embodiments of the present disclosure, not all of the embodiments. On the basis of the embodiments of the present disclosure, all other embodiments obtained on the premise of no creative work of those skilled in the art shall fall within the scope of protection of the present disclosure.

It is important to note that the description and claims of the present disclosure and terms "first", "second" and the like in the drawings are used to distinguish similar objects, and do not need to describe a specific sequence or a precedence order. It will be appreciated that data used in such a way may be exchanged under appropriate conditions, in order that the embodiments of the present disclosure described here can be implemented in a sequence except sequences graphically shown or described here. In addition, terms "include" and "have" and any inflexions thereof are intended to cover non-exclusive inclusions. For example, processes, methods, systems, products or equipment containing a series of steps or units do not need to clearly show those steps or units, and may include other inherent steps or units of these processes, methods, products or equipment, which are not clearly shown instead.

According to the embodiments of the present disclosure, a rule matching method is provided.

FIG. 1 is a flowchart of a rule matching method according to an embodiment of the present disclosure. As shown in FIG. 1, the method includes the steps as follows.

In step S101, a preset tagging symbol set and a target text are acquired, wherein the tagging symbol set includes a plurality of tagging symbols, the plurality of tagging symbols are symbols which are used for tagging a text according to different business requirements.

The target text in the present disclosure is a text in which text data needs to be matched. The target text may come from information and a file, or may come from a web page in the internet.

Alternatively, in the rule matching method provided by the embodiment of the present disclosure, before the preset tagging symbol set and the target text are acquired, the method further includes: determining a target business requirement in a plurality of business requirements; determining a tagging symbol according to the target business requirement to obtain a plurality of tagging symbols; and forming a tagging symbol set by the plurality of tagging symbols.

Different types of tags may be absolutely defined for different business requirements to support specific business. For example, the plurality of business requirements include:

named entity recognition, Query intention understanding, semantic understanding, part-of-speech tagging task, Chinese word segmentation task and the like. When the Chinese word segmentation task is taken as a target business requirement, objects needing to be tagged for the Chinese word segmentation task are different elements forming a term, "B" may be defined as a first character of a term, "E" serves as a last character of a term, and "M" serves as a middle part of a term. Thus, a word "Ping Guo" may be tagged with "B E", and a word "Tian An Men" may be tagged with "B M E". Or, when the part-of-speech tagging task is taken as a target business requirement, a tagged object is a segmental word, "Noun" may be defined as a noun, and "Verb" may be defined as a verb. Or, when dependency parsing is taken as a target business requirement, a tagged object may express a relative position relation between an object modified by a current word and a current word, "SBV_3" may be defined as a subject-predicate relation, and a head word is located at a position shifting backwards for three words from a current word. Besides, for the business requirements such as named entity recognition, Query intention understanding and semantics understanding, a corresponding tagging form may be customized according to specific situations. For example, a tag "Person" may be defined for a personal name, a tag "Location" may be defined for a geographical name, or "Last Name" may be defined for a last name in a personal name, and "First Name" may be defined for a name.

The plurality of tagging symbols are determined according to a target business requirement to obtain a tagging symbol set.

In step S102, a plurality of matching rule templates are determined according to the plurality of tagging symbols.

A tagging symbol set including plurality of tagging symbols is obtained according to the target business requirement. After the tagging symbol set is determined, in order to extract information from a character string of a target text, plurality of matching rule templates are predetermined according to an information content needing to be extracted. For example, a tagging symbol defines that "Person" represents a personal name, "De" represents's and "Noun" represents other nouns except the personal name, a matching rule template is: "*/Person+'s/De+*/Noun" may represent a series of corresponding relations namely "{Mouren} De {Mouwu}". Under some complicated situations, when a triple relation namely "<{Mouwu}, Shuyu, {Mouren}>" is desired according to a business requirement and not only the above situation can express the relation, other expression modes may be continuously covered in a manner of additionally determining a matching rule template. For example, the matching rule template is: "*/Noun+Shi/%+*/Person+ De/De", where "*" and "%" are wildcard characters defined in the present disclosure, corresponding to any character string and any tag respectively. Likewise, specific symbols of the wildcard characters are not limited in the present disclosure. It can thus be seen that the matching rule template of the present disclosure contains a matching condition for a character string and a matching condition for a tagging symbol at the same time, and the tagging symbol contains a meaning and a rule hidden behind the character string. Therefore, a text under a specific business requirement may be matched by means of the two matching conditions.

In step S103, the target text is converted according to the plurality of tagging symbols to obtain a sequence to be matched.

Herein, the sequence to be matched is a sequence formed by converting text data in the target text.

Alternatively, in the rule matching method provided by the embodiment of the present disclosure, the step of converting the target text according to the plurality of tagging symbols to obtain a sequence to be matched includes: word segmentation is performed on the target text to obtain a character string sequence, wherein the character string sequence includes: a sequence formed by a plurality of character string units, the character string units are used for identifying the character string sequence; a tagging symbol sequence corresponding to each character string unit in the character string sequence is determined according to the tagging symbols to obtain a tagging symbol sequence set; and the tagging symbol sequence set is taken as the sequence to be matched.

The text data in the target text is a character string in an article, sentence or phrase and word group form in general, such as "Zhang San De Bijiben Zai Zhuozi Shang" and "Zhe Shi Li Si De Shouji". A character string sequence refers to a sequence formed by character string units having an independent tagging symbol identification ability. Here, the character string unit may be a phrase or a single word. For example, in the above example, "Zhang San De Bijiben Zai Zhuozi Shang" is a character string sequence, and that is because "Zhang San", "De", "Bijiben", "Zai", "Zhuozi", "Shang" may correspond to independent part-of-speech tags. Likewise, when a last name and a first name are taken as independent tags, "Zhang San" may be divided into "Zhang" and "San" to serve as independent character string units to be processed respectively. Finally, a tagging sequence refers to a tagging symbol sequence corresponding to each character string unit in a character string sequence. In the above example, "Person De Noun Prep Noun Prep" is a tagging sequence corresponding to "Zhang San De Bijiben Zai Zhuozi Shang", and "Person De Noun Prep Noun Prep" serves as a sequence to be matched.

Alternatively, in the rule matching method provided by the embodiment of the present disclosure, after obtaining a tagging symbol sequence set, the method may further include: the character string sequence and the tagging symbol sequence set are combined to obtain the sequence to be matched.

Due to a one-to-one corresponding relation between a character string sequence and a tagging sequence, the two sequences may be combined for representation such as "Zhang San/Person De/De Bijiben/Noun Zai/Prep Zhuozi/Noun Shang/Prep", and "Zhang San/Person De/De Bijiben/Noun Zai/Prep Zhuozi/Noun Shang/Prep" serves as a sequence to be matched.

It is important to note that there are many methods for converting text data in a target text into a character string sequence and a tagging sequence. Any method is the measure of achieving the aim of conversion. For example, there are the following conversion methods: first manner: converting in a manual tagging manner, wherein as mentioned in the above example, text data may be split into character string units in a manual manner, and a tagging symbol is set for each character string unit; second manner: automatically converting via external resources, wherein for example, processing is performed via common personal name dictionary resources, as long as a personal name in a dictionary appears in text data, the personal name is independent as a character string unit, and is endowed with a tag Person; and third manner: automatically converting via a sequence tagging model, wherein for example, the issue of conversion may be treated as an issue of tagging a sequence label by using a common sequence tagging algorithm, an HMM or CRF or other algorithms. This manner is relatively suitable for a system with high automation requirement. In addition, it is appropriate to use this conversion method for a complicated tagging type such as semantic role tagging. A specific conversion implementing manner is not limited in the present disclosure.

In step S104, the sequence to be matched is matched by using the matching rule templates.

The sequence to be matched is matched by using the determined plurality of matching rule templates.

Alternatively, in the rule matching method provided by the embodiment of the present disclosure, the step of matching, by using the plurality of matching rule templates, the sequence to be matched includes: a first matching rule template is determined from the plurality of matching rule templates, wherein the first matching rule template includes a plurality of match items; each match item in the first matching rule template is matched one by one with a corresponding character in the sequence to be matched; when in the sequence to be matched, there is a corresponding character matched one by one with each match item in the first matching rule template, it is determined that a matching result is True; and when in the sequence to be matched, there is not a corresponding character matched one by one with each match item in the first matching rule template, a second matching rule template in the plurality of matching rule templates is taken as the first matching rule template to be matched with the sequence to be matched until a matching result is True or all matching rule templates are matched with the sequence to be matched respectively.

It is important to note that the first matching rule template is a current matching rule template for matching, and a second matching rule template is a next matching template after matching of the first matching rule template is ended.

For example, rule_index and term_index are set to represent an index position of a matching rule template and an index position of a sequence to be matched respectively; T[term_index] represents a character string unit and a tagging symbol under a corresponding index position of a sequence to be matched; and R[rule_index] represents a matching template under a corresponding index position of a rule template. Tlength represents the length of a sequence to be matched; Rlength represents the length of a matching rule template; and Boolean IsMatch (Rule r, Term t) represents a matching method. Initialization is performed to judge Tlength>Rlength, if it is False, it directly jumps out; and otherwise, all initial index positions are set as zero, namely rule_index=0, and term_index=0. For each matching rule template in multiple matching rule templates and a sequence to be matched, a specific matching process includes the steps as follows.

In the first step, Term and Rule at current index positions are matched, and a matching result is recorded as isMatch. If isMatch is True, it is shown that the current index positions are successfully matched, and the second step is executed. Otherwise, if isMatch is False, it is shown that the current index positions are unsuccessfully matched, and the third step is executed.

In the second step, it is judged rule_index<(Rlength−1), that is, whether it is the last item of a matching rule template. If it is True, it is shown that the whole template is successfully matched, and the fifth step is executed. If it is False, it is shown that matching is not ended, and the fourth step is executed.

In the third step, when matching is unsuccessful, it is necessary to return to a next position to be matched for a subsequent matching operation. Specifically, term_index returns rule_index index positions, namely term_index=-rule_index, then rule_index is reset as −1, and then the fourth step is executed.

In the fourth step, preparation for next matching is executed, that is, it is judged whether there is a remaining item after the term_index, if not, it is shown that a sequence to be matched is ended, but rules are not matched completely, that is, matching fails, and False or Null is output. Otherwise, rule_index++, term_index++, and the first step is executed.

In the fifth step, a matching result is returned, and if there is no special identifier in a matching template, successful matching True is returned.

For example, a sequence to be matched is "Zhang San/Person De/De Bijiben/Noun Zai/Prep Zhuozi/Noun Shang/Prep", and a matching rule template 1 is "*/Person+Shi/%+*/Noun". During matching, the first step of matching "Zhang San/Person" and "*/Person" successfully is executed, the second step of judging that the last item of a template is not reached is executed, the fourth step of judging that the last item of a sequence to be matched is not reached is executed, an index position is updated, the first step of matching "De/De" and "De/%" successfully is executed, the second step of judging that the last item of the template is not reached is executed, the fourth step of judging that the last item of the sequence to be matched is not reached is executed, the index position is updated, the first step of matching "Bijiben/Noun" and "*/Noun" successfully is executed, the second step of judging the last item of the template is executed, and the fifth step of output True is executed.

A matching rule template 2 is "*/Noun+Shi/%+*/Person+De/%". During matching, the first step of matching "Zhang San/Person" and "*/Noun" unsuccessfully is executed, the third step of returning an index position is executed, the fourth step of judging that the last item of a sequence to be matched is not reached is executed, the index position is updated, the first step of matching "De/De" and "*/Noun" unsuccessfully is executed, the third step of returning the index position is executed, the fourth step of judging that the last item of the sequence to be matched is not reached is executed, the index position is updated, the first step of matching "Bijiben/Noun" and "*/Noun" successfully is executed, the second step of judging that the last item of a template is not reached is executed, the fourth step of judging that the last item of the sequence to be matched is not reached is executed, the index position is updated, the first step of matching "Zai/Prep" and "Shirk" unsuccessfully is executed, the third step of returning the index position is executed, the fourth step of judging that the last item of the sequence to be matched is not reached is executed, the index position is updated, the first step of matching "Zai/Prep" and "*/Noun" unsuccessfully is executed, the third step of returning the index position is executed, the fourth step of judging that the last item of the sequence to be matched is not reached is executed, the index position is updated, the first step of matching "Zhuozi/Noun" and "*/Noun" successfully is executed, the second step of judging that the last item of the template is not reached is executed, the fourth step of judging that the last item of the sequence to be matched is not reached is executed, the index position is updated, the first step of matching "Shang/Prep" and "Shi/%" unsuccessfully is executed, the third step of returning the index position is executed, the fourth step of judging that the last item of the sequence to be matched is not reached is executed, the index position is updated, the first step of matching "Shang/Prep" and "*/Noun" unsuccessfully is executed, the third step of returning the index position is executed, the fourth step of judging that the last item of the sequence to be matched has been reached is executed, rule matching fails, and False is returned.

Alternatively, in the rule matching method provided by the embodiment of the present disclosure, the method further includes: when the matching result is determined as True, a target item in the matching rule template of which the matching result is True is acquired, wherein the target item is an identified result item needing to be returned in the matching rule templates; the value of the target item is extracted from the sequence to be matched, so as to obtain a target content; and the target content is sent to a target address.

When a result item needing to be returned is identified in a matching rule template, it is necessary to extract the value of a corresponding time to serve as a returned result to be output. For example, after matching with the matching rule template is successful, all or part of matched contents are extracted as required to serve as returned values to meet richer business requirements. For example, for the examples "Zhang San De Bijiben Zai Zhuozi Shang" and "Zhe Shi Li Si De Shouji", a Boolean result "{Mouren} De {Mouwu}" may be returned, and an extraction result "{Mouren: Zhang San, Mouwu: Bijiben}" and "{Mouren: Li Si, Mouwu: Shouji}" may also be returned.

It is important to note that because a matching rule template contains a wildcard character defined in the present disclosure, an extraction result may extract two entities A and B, and a relation R between the two entities. For example, a matching rule template is: "*/Nanren+Shi/%+*/Nvren+De/%+Zhangfu/%", an extraction result may be <Chenmou, Limou>, <Wangmou, Zhangmou> and the like, and implicit text information is flexibly acquired. The extraction result may also extract an entity A and the state of the entity such as <Baoma, Guanyugouchezixun>. The extraction result contains implicit text information, and the extraction result is sent to a target address and subsequently analyzed.

By means of the above steps, the present disclosure generates different types of tagging symbols according to different business requirement logics, and easily sets up a rule and matches implicit text information.

The rule matching method provided by the embodiment of the present disclosure includes: a preset tagging symbol set and a target text are acquired, the tagging symbol set including a plurality of tagging symbols; a plurality of matching rule templates are determined according to the plurality of tagging symbols; the target text is converted according to the plurality of tagging symbols to obtain a sequence to be matched; and a matching process is performed, by using the plurality of matching rule templates, on the sequence to be matched. The problem in the related art in which a rule matching method cannot match implicit text information is solved. By means of rule setup and matching for a tagging symbol hidden behind a sequence to be matched obtained by converting a target text, the effect of matching implicit text information is achieved.

It is important to note that the steps shown in the flowchart of the drawings may be executed in a computer system including, for example, a set of computer-executable instructions. Moreover, although a logic sequence is shown in the flowchart, the shown or described steps may be executed in a sequence different from the sequence here under certain conditions.

The embodiment of the present disclosure also provides a rule matching device. It is important to note that the rule matching device in the embodiment of the present disclosure may be used to execute the rule matching method provided by the embodiment of the present disclosure. The rule matching device provided by the embodiment of the present disclosure will be introduced below.

Figure 2:
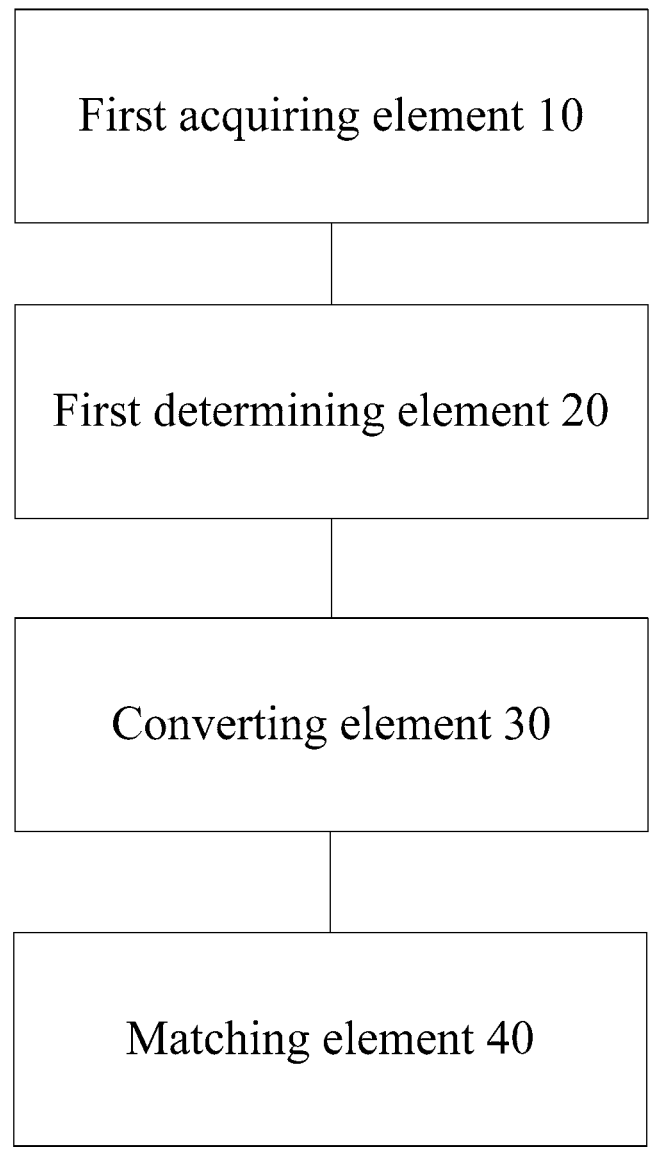
FIG. 2 is a schematic diagram of a rule matching device according to an embodiment of the present disclosure.

FIG. 2 is a schematic diagram of a rule matching device according to an embodiment of the present disclosure. As shown in FIG. 2, the device includes: a first acquiring element 10, a first determining element 20, a converting element 30 and a matching element 40.

The first acquiring element 10 is configured to acquire a preset tagging symbol set and a target text, wherein the tagging symbol set includes a plurality of tagging symbols, the plurality of tagging symbols are symbols which are used for tagging a text according to different business requirements.

The first determining element 20 is configured to determine a plurality of matching rule templates according to the plurality of tagging symbols.

The converting element 30 is configured to convert the target text according to the plurality of tagging symbols to obtain a sequence to be matched.

The matching element 40 is configured to perform, by using the plurality of matching rule templates, a matching process on the sequence to be matched.

Here, it is important to note that the first acquiring element 10, the first determining element 20, the converting element 30 and the matching element 40 may be operated in a computer terminal by serving as a part of the device, functions implemented by the above-mentioned modules may be executed by means of a processor in the computer terminal, and the computer terminal may be terminal equipment such as a smart phone (Android phone, iOS phone or the like), a tablet computer, a palmtop, Mobile Internet Devices (MID) and a PAD.

According to the rule matching device provided by the embodiment of the present disclosure, a first acquiring element 10 acquires a preset tagging symbol set and a target text, the tagging symbol set including a plurality of tagging symbols; a first determining element 20 determines a plurality of matching rule templates according to the plurality of tagging symbols; a converting element 30 converts the target text according to the plurality of tagging symbols to obtain a sequence to be matched; and a matching element 40 performs, by using the plurality of rule matching templates, a matching process on the sequence to be matched. The problem in the related art in which a rule matching method cannot match implicit text information is solved. By means of rule setup and matching for a tagging symbol hidden behind a sequence to be matched obtained by converting a target text, the effect of matching implicit text information is achieved.

Alternatively, in the rule matching device provided by the embodiment of the present disclosure, the matching element 40 includes: a first determining component, configured to determine a first matching rule template from the plurality of matching rule templates, wherein the first matching rule template includes a plurality of match items; a first matching component, configured to match one by one, each match item in the first matching rule template with a corresponding character in the sequence to be matched; an acquiring component, configured to, when in the sequence to be matched, there is a corresponding character matched one by one with each match item in the first matching rule template, determine that a matching result is True; and a second matching component, configured to when in the sequence to be matched, there is not a corresponding character matched one by one with each match item in the first matching rule template, take a second matching rule template in the plurality of matching rule templates as the first matching rule template to be matched with the sequence to be matched until a matching result is True or all matching rule templates are matched with the sequence to be matched respectively.

Alternatively, in the rule matching device provided by the embodiment of the present disclosure, the device further includes: a second determining element, configured to, when the matching result is determined as True, acquire a target item in a matching rule template of which the matching result is True, wherein the target item is an identified result item needing to be returned in the matching rule templates; a second acquiring element, configured to extract a value of the target item from the sequence to be matched, as to obtain target content; and a sending element, configured to send the target content to a target address.

Alternatively, in the rule matching device provided by the embodiment of the present disclosure, the converting element 30 includes: a processing component, configured to perform word segmentation on the target text to obtain a character string sequence, wherein the character string sequence comprises: a sequence formed by a plurality of character string units, the character string units are used for identifying the character string sequence; a second determining component, configured to determine, according to the plurality of tagging symbols, a tagging symbol sequence corresponding to each character string unit in the character string sequence to obtain a tagging symbol sequence set; and a third determining component, configured to take the tagging symbol sequence set as the sequence to be matched.

Alternatively, in the rule matching device provided by the embodiment of the present disclosure, the device further includes: a processing element, configured to combine, after obtaining the tagging symbol sequence set, the character string sequence and the tagging symbol sequence set to obtain the sequence to be matched.

Each function unit provided by the embodiment of the present disclosure may be operated in a mobile terminal, a computer terminal or a similar operating device, or may be stored as a part of a storage medium.

Hereupon, the embodiment of the present invention may provide a computer terminal, and the computer terminal may be any one computer terminal equipment in a computer terminal group. Alternatively, in the present embodiment, the computer terminal may also be replaced with terminal equipment such as a mobile terminal.

Alternatively, in the present embodiment, the computer terminal may be located on at least one piece of network equipment in multiple pieces of network equipment of a computer network.

In the present embodiment, the computer terminal may execute program codes of the following steps in the rule matching method: acquiring a preset tagging symbol set and a target text, the tagging symbol set including a plurality of tagging symbols, the plurality of tagging symbols being symbols used for tagging the text according to different business requirements; determining a plurality of matching rule templates according to the plurality of tagging symbols; converting the target text according to the tagging symbols to obtain a sequence to be matched; and performing, by using the plurality of matching rule templates, a matching process on the sequence to be matched.

Alternatively, the computer terminal may include: one or more processors, memories and transmission devices.

Herein, the memory may be configured to store a software program and a module such as a program instruction/module corresponding to the rule matching method and device in the embodiment of the present invention, and the processor executes various function applications and data processing by operating the software program and the module stored in the memory, namely implementing the above-mentioned rule matching method. The memory may include a high-speed random access memory, and may further include a nonvolatile memory such as one or more magnetic storage devices, flash memories or other nonvolatile solid state memories. In some examples, the memory may further include memories remote from the processor, wherein these remote memories may be connected to a terminal via a network. The network examples include, but not limited to, internet, intranet, a local area network, a mobile communication network and combinations.

The transmission device is configured to receive or transmit data via a network. The specific network examples may include a cable network and a radio network. In an example, the transmission device includes a Network Interface Controller (NIC), which may be connected with other network equipment and routers via a network cable so as to communicate with the internet or local area network. In an example, the transmission device is a Radio Frequency (RF) module, used to communicate with the internet in a radio manner.

Herein, specifically, the memory is configured to store information about a preset action condition and a preset right user, and an application program.

The processor may call the information and the application program stored by the memory via the transmission device, so as to execute program codes of the method steps in each alternative or preferred embodiment in the above-mentioned method embodiments.

Those of ordinary skill in the art may understand that the computer terminal may be terminal equipment such as a smart phone (Android phone, iOS phone or the like), a tablet computer, a palmtop, an MID and a PAD.

Those of ordinary skill in the art may understand that all or some steps in various methods of the above-mentioned embodiments may be completed by instructing relevant hardware of terminal equipment via a program, the program may be stored in a computer-readable storage medium, and the storage medium may include: a flash disk, a Read-Only Memory (ROM), a Random Access Memory (RAM), a magnetic disk or an optical disk.

The embodiment of the present invention also provides a storage medium. Alternatively, in the present embodiment, the storage medium may be configured to store program codes for executing the rule matching method provided by the above-mentioned method embodiments and device embodiments.

Alternatively, in the present embodiment, the storage medium may be located in any one computer terminal in a computer terminal group in a computer network, or in any one mobile terminal in a mobile terminal group.

Alternatively, in the present embodiment, the storage medium is configured to store program codes for executing the following steps: acquiring a preset tagging symbol set and a target text, the tagging symbol set including a plurality of tagging symbols, the plurality of tagging symbols being symbols used for tagging the text according to different business requirements; determining a plurality of matching rule templates according to the plurality of tagging symbols; converting the target text according to the plurality of tagging symbols to obtain a sequence to be matched; and performing, by using the rule matching templates, a matching process on the sequence to be matched.

Alternatively, in the present embodiment, the storage medium may also be configured to store program codes of various preferred or alternative method steps provided by the rule matching method.

The rule matching method and device according to the present invention are described as above in an example manner with reference to the drawings. However, those skilled in the art should understand that various improvements may also be made on the rule matching method and device provided by the present invention without departing from the content of the present invention. Therefore, the scope of protection of the present invention should be determined by the content of the appended claims.

The rule matching device includes a processor and a memory. The first acquiring element, the first determining element, the converting element and the matching element are stored in the memory as program units, and the processor executes the program units stored in the memory to achieve corresponding functions.

The processor contains a kernel, which calls a corresponding program unit from the memory. There may be one or more kernels, and rule matching is performed by adjusting kernel parameters.

The memory may include a volatile memory, an RAM and/or a non-volatile memory in a computer-readable medium such as an ROM or a flash RAM, the memory including at least one storage chip.

The present disclosure also provides a computer program product. When being executed on data processing equipment, the computer program product is suitable for executing program codes initializing the following method steps: acquiring a preset tagging symbol set and a target text, the tagging symbol set including a plurality of tagging symbols, the plurality of tagging symbols being symbols used for tagging the text according to different business requirements; determining a plurality of matching rule templates according to the plurality of tagging symbols; converting the target text according to the plurality of tagging symbols to obtain a sequence to be matched; and performing, by using the rule matching templates, a matching process on the sequence to be matched.

It is important to note that for simple description, each of the above-mentioned method embodiments is expressed as a series of action combinations. However, those skilled in the art should know that the embodiments of the present disclosure are not limited by a described action sequence. That is because some steps may be executed in other sequences or at the same time according to the embodiments of the present disclosure. Secondly, those skilled in the art should also know that the embodiments described in the description fall within alternative embodiments, and involved actions and modules may not be necessary for the present disclosure.

In the above-mentioned embodiments, descriptions for each embodiment are emphasized respectively, and parts which are not elaborated in a certain embodiment may refer to relevant descriptions for other embodiments.

In several embodiments provided by the present disclosure, it will be appreciated that the disclosed device may be implemented in another manner. For example, the device embodiment described above is only schematic. For example, division of the units is only logic function division, and other division manners may be adopted during practical implementation. For example, multiple units or components may be combined or integrated into another system, or some characteristics may be neglected or not executed.

The above-mentioned units described as separate parts may or may not be physically separated, and parts displayed as units may or may not be physical units, and namely may be located in the same place, or may also be distributed to multiple network units. Part or all of the units may be selected to achieve the purpose of the solutions of the present embodiment according to a practical requirement.

In addition, each function unit in each embodiment of the present disclosure may be integrated into a processing element, each unit may also exist independently, and two or more than two units may also be integrated into a unit. The above-mentioned integrated unit may be implemented in a form of hardware, and may also be implemented in a form of software function unit.

Obviously, those skilled in the art shall understand that all of the above-mentioned modules or steps in the present disclosure may be implemented by using a general calculation device, may be centralized on a single calculation device or may be distributed on a network composed of multiple calculation devices. Alternatively, they may be implemented by using executable program codes of the calculation devices. Thus, they may be stored in a storage device and executed by the calculation devices, or they are manufactured into each integrated circuit module respectively, or multiple modules or steps therein are manufactured into a single integrated circuit module. Thus, the present disclosure is not limited to combination of any specific hardware and software.

The above is only the preferred embodiments of the present disclosure, and not used to limit the present disclosure. As will occur to those skilled in the art, the present disclosure is susceptible to various modifications and changes. Any modifications, equivalent replacements, improvements and the like made within the spirit and principle of the present disclosure should fall within the scope of protection of the present disclosure.

What is claimed is:

1. A rule matching device, comprising:
    a first acquiring element, configured to acquire a preset tagging symbol set and a target text, wherein the tagging symbol set comprises a plurality of tagging symbols, the plurality of tagging symbols are symbols which are used for tagging a text according to different business requirements;
    a first determining element, configured to determine a plurality of matching rule templates according to the plurality of tagging symbols;
    a converting element, configured to convert the target text according to the plurality of tagging symbols to obtain a sequence to be matched; and
    a matching element, configured to perform, by using the plurality of matching rule templates, a matching process on the sequence to be matched,
    wherein the matching element comprises:
        a first determining component, configured to determine a first matching rule template from the plurality of matching rule templates, wherein the first matching rule template comprises a plurality of match items;
        a first matching component, configured to match one by one, each match item in the first matching rule template with a corresponding character in the sequence to be matched;
        an acquiring component, configured to, when in the sequence to be matched, there is a corresponding character matched one by one with each match item in the first matching rule template, determine that a matching result is True; and a second matching component, configured to, when in the sequence to be matched, there is not a corresponding character matched one by one with each match item in the first matching rule template, take a second matching rule template in the plurality of matching rule templates as the first matching rule template to be matched with the sequence to be matched until a matching result is True or all matching rule templates are matched with the sequence to be matched respectively.

2. The device as claimed in claim 1, further comprising:
a second determining element, configured to, when the matching result is determined as True, acquire a target item in a matching rule template of which the matching result is True, wherein the target item is an identified result item needing to be returned in the matching rule templates;
a second acquiring element, configured to extract a value of the target item from the sequence to be matched, as to obtain target content; and
a sending element, configured to send the target content to a target address.

3. The device as claimed in claim 1, wherein the converting element comprises:
a processing component, configured to perform word segmentation on the target text to obtain a character string sequence, wherein the character string sequence comprises: a sequence formed by a plurality of character string units, the character string units are used for identifying the character string sequence;
a second determining component, configured to determine, according to the plurality of tagging symbols, a tagging symbol sequence corresponding to each character string unit in the character string sequence to obtain a tagging symbol sequence set; and
a third determining component, configured to take the tagging symbol sequence set as the sequence to be matched.

4. The device as claimed in claim 3, further comprising:
a processing element, configured to combine, after obtaining the tagging symbol sequence set, the character string sequence and the tagging symbol sequence set to obtain the sequence to be matched.

* * * * *